Figure 1:
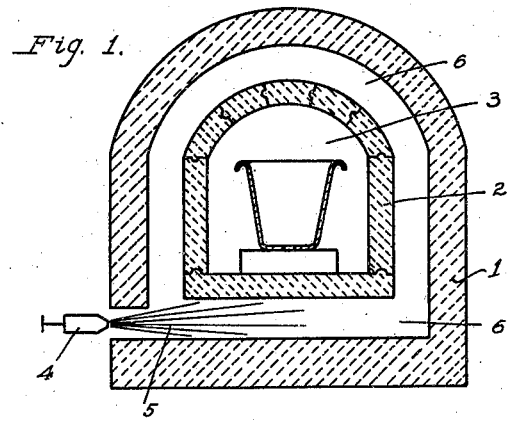

March 30, 1937.      R. C. BENNER ET AL      2,075,694

FURNACE WALL AND THE LIKE

Filed May 31, 1934

INVENTORS
RAYMOND C. BENNER
GEORGE J. EASTER

BY R. C. Benner

ATTORNEY.

Patented Mar. 30, 1937

2,075,694

UNITED STATES PATENT OFFICE 2,075,694

FURNACE WALL AND THE LIKE

Raymond C. Benner and George J. Easter, Niagara Falls, N. Y., assignors, by mesne assignments, to The Carborundum Company, Niagara Falls, N. Y., a corporation of Delaware Application May 31, 1934, Serial No. 728,572

5 Claims. (Cl. 263—42)

This invention relates to apparatus embodying a wall whose high heat conductivity contributes to the efficient operation of the apparatus; and more particularly to the production of suitable heat conducting material for such a wall.

As efficiency in the utilization of the heat of hot gases has received more and more the attention of designers, the demand has arisen for heat conducting walls having higher rate of conductivity than that of the common fire-clay refractories which have heretofore been considered the cheapest and have, therefore, been so widely used. Refractories of other materials such as bonded silicon carbide can replace the fire-clay refractories where the gain in rate of heat conductivity offsets the higher cost of the silicon carbide refractories, and where the latter are not subject to excessive oxidation or excessive erosive action by alkaline substances. It has been proposed to substitute other bonded refractory materials for silicon carbide in those installations where oxidation or the erosive action of alkaline slags would be so excessive as to overcome the advantage of the high heat conductivity of silicon carbide and render its use uneconomical. It will be remembered, however, that ordinarily it is simply a matter of balancing up the saving due to greater heat conductivity against the higher cost of the refractory materials used to obtain the greater heat transfer rate. If the increased cost of the material more than offsets the increased efficiency resulting from the greater rate of heat transfer, such material cannot ordinarily be used.

We have discovered that heat conducting walls composed of cast aluminous material in which the alumina content is at least 85% may be economically employed, particularly where it is not economical to employ bonded silicon carbide refractories due to the short life of the latter. Alumina is particularly resistant to corrosion by alkaline substances. This characteristic means that a furnace wall, a muffle or the like, if made of such material, may be installed and expected to operate without shut-downs for repairs for a sufficiently longer time than a heat conducting wall of fire-clay subjected to the same conditions so that there is considerable saving from this aspect alone. This saving coupled with the greater efficiency of the apparatus due to the higher rate of heat conductivity of the wall frequently makes it economical to install a heat conducting wall of such material. Examples of installations in which our invention is applicable are glass leers, water and air-cooled boiler walls, coke ovens, radiating combustion chambers, recuperators and muffles of various kinds.

Figure 2:
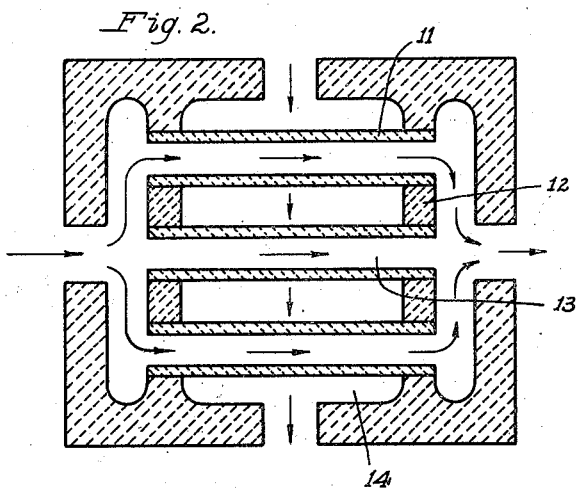

In the accompanying drawing, showing characteristic applications of our invention, Fig. 1 is a vertical section through an enameling furnace; Fig. 2 is a horizontal section through a recuperator for recovering waste heat from flue gases, and Fig. 3 is a vertical section through a characteristic annealing furnace heated by combustion chambers composed of fused cast alumina.

In Fig. 1 is illustrated an article such as a bath tub to be enameled, contained in a furnace chamber 3 surrounded by walls 2 of cast fused alumina. In this application, heat is supplied by a flame 5 from an oil burner 4, the flame and combustion gases passing through the passageway 6 surrounding the muffle and inside of the outer brickwork structure 1.

In the recuperator shown in Fig. 2 the hot flue gases flow crosswise of tubes 11 composed of cast fused alumina and supported in a wall 12, the hot gases flowing through ducts 14. The air to be preheated flows through the air ducts 13 within the tubes 11, the direction of air and flue gas flow being indicated by arrows.

Figure 3:
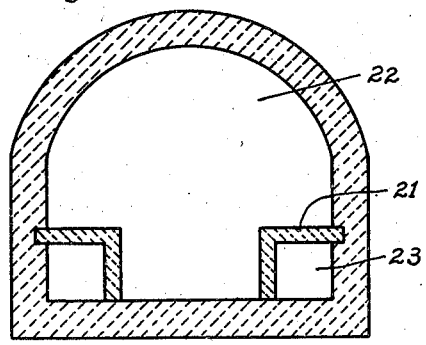

In the annealing furnace shown in Fig. 3, the walls 21 of the combustion chamber 23 are made of cast fused alumina which separates the combustion chamber from the work space 2 in which the articles to be annealed are placed. Heat is supplied by means of an oil or gas flame within the combustion chamber 23.

We have found that heat conducting walls can be made up of sections cast in the form of slabs or the like from fused refractory materials such as alumina, or mixtures of alumina with alkaline earth oxide such as magnesium or barium oxide. The alumina is particularly resistant to the corrosive attack of alkaline substances when about 5% of soda ash or other source of alkaline oxide is added, and has remarkably long life when used in exposed locations in enameling or annealing ovens or in leers or muffles where erosive alkaline substances are encountered.

It is of importance that the aluminous material be cast. It is furthermore of importance that the content of alumina be at least 85% as otherwise we have found the thermal conductivity to be materially decreased. Cast refractories are impermeable and the loss of efficiency due to leakage of the hot gases through the wall is thus largely eliminated. A cast refractory moreover has the advantage that its resistance to corrosion is not reduced by the susceptibility of the bond to the corrosive action of the gases or the like contacting with the surface of the wall. Thus, while alumina itself is highly resistant to the corrosive action of alkaline substances, it is well nigh impossible to obtain a bonded alumina refractory which is equally as resistant to the corrosive action of alkaline substances. Moreover, the rate of heat conductivity of a bonded alumina refractory is considerably less than that of a cast alumina refractory.

While refractories composed essentially of alumina are entirely satisfactory for a large variety of installations embodying a heat conducting wall, there are a number of situations in which it is equally desirable, if not preferable, to employ mixtures of alumina with alkaline earth oxides to the extent of about 5 to 15%. The admixture of a small percentage of oxides of the alkaline earths, preferably about 5%, to the alumina increases the resistance of the alumina refractories to the attack of alkaline substances. Moreover, it is rather remarkable that cast refractories composed of alumina and from about 5 to about 10% alkaline earth oxide have a higher rate of heat conductivity than either alumina or a mixture of alumina with sufficient oxide to yield a spinel.

The approximate heat conductivities of various pertinent materials are given in the following table, the heat conductivity in each case being calculated in calories per second per square centimeter of area per centimeter of thickness per degree centigrade of temperature difference.

| | |
|---|---|
| Fireclay | .0035 |
| Silica | .0042 |
| Silicon carbide | .0360 |
| Bonded fused alumina | .0088 |

Cast fused refractory articles composed of alumina or of alumina mixed with other suitable oxides:

| | |
|---|---|
| Cast fused alumina | .0170 |
| $Al_2O_3$ 95% BaO 5% | .0191 |
| $Al_2O_3$ 95% MgO 5% | .0194 |
| $Al_2O_3$ 72% MgO 28% (spinel) | .0136 |

It will be noted from the above table that the cast fused alumina has a markedly higher rate of heat conductivity than bonded refractories such as bonded fused alumina. All of these cast refractories have a rate of heat conductivity which is at least about four times that of fireclay.

The refractories are produced by fusing in an electric furnace materials of proper composition for yielding the refractory oxide or mixture of refractory oxides best adapted for the purpose in view. For instance, for a refractory article composed principally of lumina, a bauxite ore may be introduced into the furnace. By suitable manipulation of the furnace, a product can be obtained which is at least 93% alumina. The remainder will include a small percent of silica and perhaps some titanium oxide and iron oxide. Magnesia may be present to a small extent. As has been above mentioned, the alumina can be rendered much more resistant to the action of alkaline slags, glass and the like by adding a small proportion of soda ash or other source of alkaline oxide.

After the raw material has been melted in the electric furnace, the molten refractory oxides are cast in suitable molds to form slabs or the like. The cooling is controlled so as to prevent stresses being produced in the article, either by externally applied heat or by soaking the pieces in accordance with well known procedure.

When proper precautions, such as are well understood by those skilled in the art, are taken, there will be produced relatively solid, impermeable refractory castings having a high melting point and a conductivity rate which is 0.015 or higher. The distinctly better performance of the cast refractories as compared with the more porous bonded refractories, as shown by the greater heat conductivity of the former, is sufficient advantage by itself to recommend these cast refractories for use in heat conducting walls. These refractories will be found to withstand chemical erosion much better than the bonded refractories heretofore used, and marked economies in use can be effected.

While we have given rather in detail the method which we have found most advantageous for producing the refractory articles described and claimed herein, it will be apparent that our invention is not limited to the details of the method given for producing the refractory. Moreover, although we have discussed certain impurities which may be present in the raw materials used for producing such refractories, other ingredients may occur in raw materials adapted for use as a source of the refractory oxides entering into the refractory articles, and accordingly it will be understood that our invention is not limited in these details, as it may be otherwise embodied and practiced within the scope of the following claims.

We claim:—

1. In a furnace, a compartment for containing material to be heated, said compartment being bounded by a wall of cast fused alumina, and a source of heat adjacent said wall and on the opposite side thereof from said compartment, whereby said compartment and material therein are heated.

2. In a furnace, a compartment for containing material to be heated, said compartment being bounded by a wall of cast fused refractory oxides, and a source of heat adjacent said wall and on the opposite side thereof from said compartment, said refractory oxides being composed of at least 85% alumina and 5–15% alkaline earth oxides.

3. In a furnace, a compartment for containing material to be heated, said compartment being bounded by a wall comprising cast refractory sections consisting essentially of alumina, and a source of heat adjacent said wall and on the opposite side thereof from said compartment, whereby said compartment and material therein are heated.

4. In a furnace, a compartment for containing material to be heated, said compartment being bounded by a wall of cast refractory sections composed of about 95% alumina and about 5% alkaline earth oxides, and a source of heat adjacent said wall and on the opposite side thereof from said compartment, whereby said compartment and material therein are heated.

5. In a furnace, a compartment for containing material to be heated, said compartment being bounded by a wall of cast refractory sections composed of 90–95% alumina and 5–10% magnesia, and a source of heat adjacent said wall and on the opposite side thereof from said compartment, whereby said compartment and material therein are heated.

RAYMOND C. BENNER.
GEORGE J. EASTER.